(12) United States Patent
Katou

(10) Patent No.: US 8,608,320 B2
(45) Date of Patent: Dec. 17, 2013

(54) PROJECTOR AND METHOD FOR CONTROLLING THE SAME

(75) Inventor: Atsushi Katou, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 104 days.

(21) Appl. No.: 13/138,686

(22) PCT Filed: Mar. 26, 2009

(86) PCT No.: PCT/JP2009/056063
§ 371 (c)(1),
(2), (4) Date: Sep. 19, 2011

(87) PCT Pub. No.: WO2010/109621
PCT Pub. Date: Sep. 30, 2010

(65) Prior Publication Data
US 2012/0008105 A1    Jan. 12, 2012

(51) Int. Cl.
*G03B 21/14* (2006.01)

(52) U.S. Cl.
USPC ........... 353/101; 353/30; 353/38; 353/76; 353/85; 353/122; 359/662; 359/666

(58) Field of Classification Search
USPC ......... 353/30, 31, 37, 38, 70, 76, 85, 98, 122; 359/634, 636, 642, 666, 670, 677, 683, 359/721, 813, 822; 362/317, 319–321, 324, 362/327, 335, 341, 800; 349/5, 7–9
See application file for complete search history.

(56) References Cited

U.S. PATENT DOCUMENTS

| 5,825,555 A | * | 10/1998 | Oono et al. | 359/668 |
| 5,879,065 A | * | 3/1999 | Shirochi et al. | 353/8 |

(Continued)

FOREIGN PATENT DOCUMENTS

| JP | 2000-166656 A | 6/2000 |
| JP | 2005-134563 A | 5/2005 |

(Continued)

OTHER PUBLICATIONS

Japanese Office Action dated Nov. 16, 2012 with partial English translation.
Japanese Office Action dated Feb. 7, 2012, with partial English translation.

(Continued)

*Primary Examiner* — Georgia Y Epps
*Assistant Examiner* — Sultan Chowdhury
(74) *Attorney, Agent, or Firm* — McGinn Intellectual Property Law Group, PLLC

(57) ABSTRACT

There is provided a projector that uses a laser light source and is safe and realizes high brightness. The projector applies a laser beam emitted from a laser light source (101) to an image modulation device (105) and magnifies and projects an image formed in the image modulation device (105) by a zoom lens (106). The projector includes a control mechanism (108) for controlling the amount of energy of the light beam in response to a change in a focal distance of the zoom lens (106) in such a way that an energy density of the laser beam developed on a light emitting surface of the zoom lens (106) is kept at a specified value or smaller than the specified value. The specified value is the energy density of the laser beam in a case where the focal distance of the zoom lens (106) is set to the shortest value and is an accessible emission limit value (AEL value) that satisfies the laser safety class of the projector.

14 Claims, 3 Drawing Sheets

(56) References Cited

U.S. PATENT DOCUMENTS

| | | | |
|---|---|---|---|
| 5,978,051 A * | 11/1999 | Gohman et al. | 348/766 |
| 7,309,133 B2 * | 12/2007 | Miyasaka | 353/122 |
| 7,455,411 B2 * | 11/2008 | Sato | 353/122 |
| 2003/0147050 A1 * | 8/2003 | Nakamura | 353/31 |
| 2009/0091730 A1 * | 4/2009 | Tanaka | 355/67 |
| 2009/0122291 A1 * | 5/2009 | Moriyoshi | 355/71 |
| 2009/0147224 A1 * | 6/2009 | Kurozuka et al. | 353/98 |

FOREIGN PATENT DOCUMENTS

| | | |
|---|---|---|
| JP | 2008-058454 A | 3/2008 |
| JP | 2008-205814 A | 9/2008 |

OTHER PUBLICATIONS

Japanese Office Action dated Apr. 4, 2013 with English translation thereof.

* cited by examiner

PROJECTOR AND METHOD FOR CONTROLLING THE SAME

TECHNICAL FIELD

The present invention relates to a projector using a laser light source and to a method for controlling the same.

BACKGROUND ART

As to a projector, the research and development of a product using a solid light source in place of a discharge lamp have been actively conducted with the aim of improving performance and reducing size and cost. For example, a rear projection TV and a pocket projector employing an LED light source have been produced on a commercial basis.

As to the solid light source for the projector, a laser light source is regarded as being promising along with an LED. Everybody recognizes that the laser light source has a high potential capacity as a light source, but a projector employing the laser light source has not been put into practical use. This is not only because an inexpensive semiconductor laser emitting green light has not been put into practical use but also because various regulations are required in terms of the characteristics of a laser light source.

A beam scan type projector that scans a laser beam horizontally and vertically by using a MEMS scanner to display an image can be reduced in size to an extent that cannot be considered in comparison with an existing projector. However, the beam scan type projector needs to observe safety standards stipulated in the international laser safety standards IEC60825 and the like. In the classification by this IEC60825, the light output of the light source is regulated to a small level. For this reason, it is considered to be difficult to realize a projector having brightness high enough for practical use or the same brightness as a conventional projector using a discharge lamp. In this regard, an illumination intensity that is safe even if the laser beam is directly incident on a human eye is stipulated in each class, and the stipulation is different according to the conditions under which the laser beam is viewed.

On the other hand, a front projection type projector that does not directly scan a laser beam is known (for example, Japanese Unexamined Patent Publication No. 2008-58454). This is a projector of the type in which a laser light is applied to a two-dimensional micro display such as a liquid crystal light valve and a DMD (digital mirror device) and in which an image displayed on the micro display is magnified and projected by the use of an optical system such as a projection lens.

It is considered that a projector of this type can realize higher brightness than the beam scan type projector.

In this regard, when the front projection type projector employing a laser light source is used, the most dangerous state as regards safety is considered to be brought about when a human eye comes closest to a projection lens.

Usually, a micro display as small as an inch or less is used in many cases, so that it can be considered that the size of a light beam passing through a lens on a side nearest to the exit of the projection lens, that is, a side to which a human eye comes closest is larger than 7 mm which is an average diameter of the pupil of the human eye. For this reason, it is only necessary to discuss the safety of power of a laser beam that can enter the diameter of 7 mm. Hence, it is only necessary to make a calculated AEL (accessible emission limit) consistent with a safety class that a projector is desired to satisfy.

In the projector using the laser light source, especially in the case of a front projection type projector, a zoom lens is mounted as a projection lens in many cases from the viewpoint of convenience to users and superiority of a product. For example, in a case where the projector installation distance is not long enough to match the size of a screen of a projector, if the zoom magnification of the zoom lens is changed, an image projected to the screen can be adjusted to the size of the screen. In this description, when an image of a specified size is projected to the screen, the setting state of the focal distance f of the zoom lens in which a projection distance to the screen can be made shortest is referred to as a "wide state", whereas when an image of the same size as in the wide state is projected to the screen, the setting state of the focal distance f of the zoom lens in which a projection distance to the screen can be made longest is referred to as a "telescopic state".

Usually, in the zoom lens of the projector, the position and the angle of a light beam passing through a light emitting surface of the zoom lens are changed in the process in which the wide state is changed to the telescopic state. Hence, an area which is a portion of the light emitting surface of the zoom lens and which is seen as bright (an area of a portion through which a laser beam passes) is changed along with an adjustment of magnification of the zoom lens. The size of this area is larger in the wide state and is smaller in the telescopic state (see FIG. 1).

As a result, under conditions in which the laser output of the light source is constant, the difference in safety, specifically, the difference in AEL is caused between being in the wide state and in the telescopic state.

It is in the telescopic state in which a laser power density is higher than in the wide state that the laser beam is dangerous for a human eye. For this reason, if the laser output is designed to be the AEL that satisfies a safety class or less in the telescopic state, the safety class can be guaranteed over the full range in which the magnification of the zoom lens is changed. However, this measure cannot make the best use of potential capacity in the wide state in which there is an allowance for the AEL. In other words, although brightness in the wide state can be further increased legally up, the brightness cannot be increased.

DISCLOSURE OF THE INVENTION

An object of the present is to provide a projector capable of solving the problems described above and a method for controlling the same. One example of the object is to realize a projector that makes it possible to design a laser output in a wide state of a zoom lens in which the highest brightness can be achieved and that can keep safety over the full range in which the magnification of the zoom lens is changed and that utilizes a laser light source.

The present invention relates to a laser projector that uses a laser light source and a two-dimensional image modulation device and that magnifies and projects an image by a zoom lens. In particular, the present invention provides a projector in which the energy density in a laser beam area developed on a light emitting surface of the zoom lens is a specified accessible emission limit (AEL) or less over the full range in which the magnification of the zoom lens is changed.

In addition, a projector according to one state of the present invention includes a control mechanism for controlling the amount of energy of the light beam in response to a change in the focal distance of the zoom lens in such a way that the energy density per unit area of the laser beam developed on the light emitting surface of the zoom lens is kept at a specified value or smaller than the specified value.

BEST MODE FOR CARRYING OUT THE INVENTION

Figure 1:
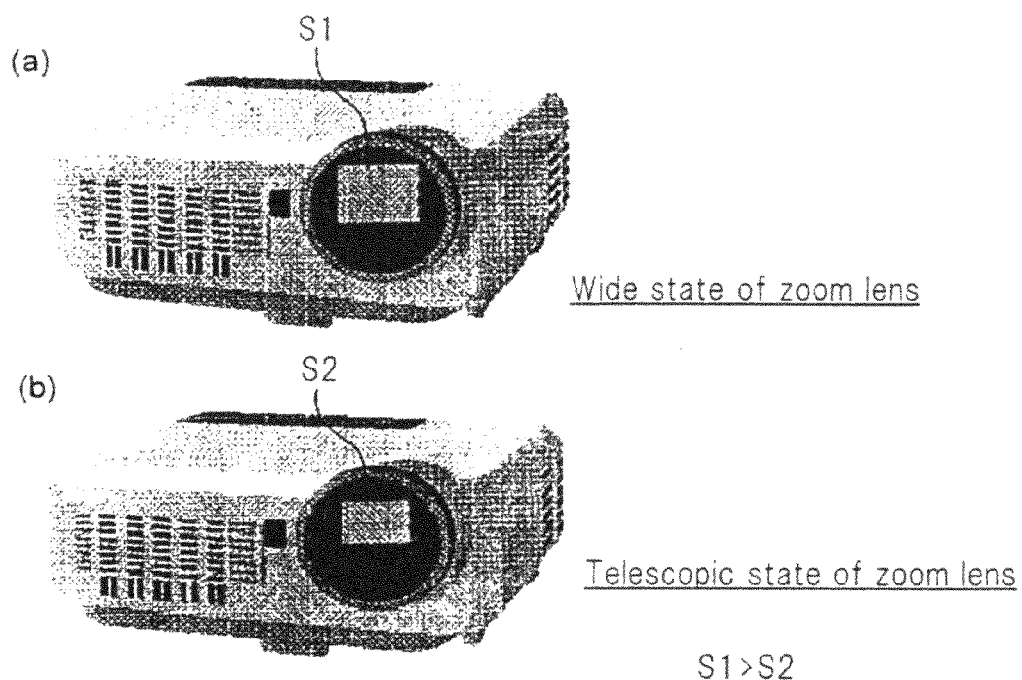
FIG. 1 is a view to illustrate the size of a laser beam area on a light emitting surface of a zoom lens of a projector (wide state and telescopic state).

Hereinafter, a mode for carrying out the present invention will be described with reference to the drawings.

The present invention relates to a projector that uses a two-dimensional micro-display such as a liquid crystal panel and a DMD as an image modulation device and that applies lights of red (R), green (G), and blue (B) to this image modulation device and that magnifies and projects an image by a projection lens. In particular, the present invention is intended for a projector that has a laser light source as a light source and that has a zoom lens as a projection lens.

First, the basic concept of the present invention will be described in detail.

In a case where a laser is used as a light source for a projector in place of an existing discharge lamp, it is a key point in the product competitiveness of the projector how sufficiently practical the projector can be and how high brightness the projector can achieve under conditions that the projector must observe the safety standards of a laser beam (IEC60825 and JIS C6802), that is, within an allowable safety class. The concept of safety of a front projector using a laser as a light source was shown as follows in a lecture titled "High-power red-light semiconductor laser and application of the same to laser projector", delivered by Sony Corporation in Special Seminar on Laser Technology that was held in April, 2008 and that was sponsored by Laser Society of Japan.

In a micro display type, a laser beam of a light source is applied to a micro display with its beam diameter magnified correspondingly to the size of the micro display by an integrator optical system such as a fry-eye lens and a rod lens. The path along which an illumination light travels after the micro display is the same as a projector based on a discharge lamp, so that a light beam magnified correspondingly to the size of the micro display is regarded as being a light source. Hence, in a micro display type projector, a power density when this light beam passes through a projection lens is found and if the found power density is an AEL (Accessible Emission Limit) value of a specified safety class or less, the micro display type projector can be considered to be safe. Further, it was determined that the duration of application of the laser that is dangerous to a human body is 0.25 sec or more.

It is a case where a human eye is set right in front of the projection lens, which is the exit from which light is projected from the projector, that a laser projector is most dangerous to the human body. At this time, there is a case where the area of a portion of a laser beam area developed on the surface of the projection lens on the side nearest to a screen (a portion which is seen bright on a light emitting surface of the projection lens) is larger than 7 mm that is the diameter of the pupil of the human eye. In this case, it is necessary for a maker to design the laser output power of the light source in such a way that the value of the laser power density (W/mm$^2$) (which is also referred to as energy density) in the laser beam area satisfies the standards of the safety class.

However, in a case where a laser projector provided with a zoom lens, the size of the laser beam area (projection screen) developed on the light emitting surface of the zoom lens is different between in a state where a focal distance f of the zoom lens is longest (that is, telescopic state) and a state where the focal distance f of the zoom lens is shortest (that is, wide state).

For example, when a zoom lens used for a front projection type projector such as a liquid crystal type and a DLP (trade mark) type is adjusted to a wide state and to a telescopic state respectively, the size of the laser beam area developed on the light emitting surface of the lens located nearest to the screen in the zoom lens is larger in the wide state than in the telescopic state (see FIGS. 1A and 1B).

This is because this is intrinsic to the zoom lens. Naturally, in a state between the wide state and the telescopic state, it is safe to consider that the size of the laser beam area developed on the light emitting surface of the lens becomes smaller as the zoom lens is adjusted from the wide state to the telescopic state.

In this way, as the focal distance of the zoom lens, that is, as the a zoom magnification is adjusted, the size of the laser beam area developed on the light emitting surface of the zoom lens located nearest to the screen is changed, whereby the laser power density is changed. Hence, this leads to cause some problems in safety if the maker does not take some counter measures.

Here, it will be described why some problems are caused when the size of the laser beam area on the light emitting surface of the zoom lens is different between in the wide state and in the telescopic state. Further, there will be also described an advantage provided by compensating the difference in the size of the laser beam area developed on the light emitting surface of the zoom lens.

At to the laser beam area developed on the light emitting surface of the zoom lens, it is viewed as if a laser light source of the size is located there. Hence, the difference in the size of the laser beam area means that the laser power density (W/mm$^2$) at that point is different. Here, of the laser classes determined by the laser safety standards, a predetermined laser safety class is assumed to be a "class 1" for the convenience of explanation.

When a projector is designed, it is required that the output of the laser light source in a device is determined in such a way that the energy density determined from the size of the laser beam area developed on the light emitting surface of the zoom lens satisfies the standard of class 1 or smaller. This is because if the energy density does not satisfy the standard of the class 1 or smaller, the projector will be illegal. If the projector is provided with a laser having as large an output power as possible within its range, that is, within the range of class 1, the projection image finally acquired by the projector can have the maximum brightness within the safety standard.

From a designer's mind, in order to realize a projector capable of projecting a bright image, a designer intends to use a laser light source having an output power that realizes the highest energy density in the laser light beam area developed on the light emitting surface of the projection lens within the range of class 1.

However, a problem will be presented in this case. When the wide state is compared with the telescopic state, the size of the laser beam area developed on the light emitting surface of the projection lens is larger in the wide state than in the telescopic state. For this reason, in the light source of the same laser output, in other words, under a drive condition in which the laser light source is constant, the energy density (laser power density) in the laser beam area is smaller in the wide state than in the telescopic state.

Thus, if the object is to make the laser power density in the laser beam area satisfy the safety standard of the class 1 over a full range in which the magnification of the zoom lens is changed, the requirement is that the energy density in the laser beam area in the telescopic state must satisfy the safety standard of at least class 1. As a result, the energy density has a more allowance in the safety class in the wide state than in the telescopic state. In other words, although higher brightness can be legally achieved in the wide state, the potential capacity is not utilized to the maximum extent possible.

Thus, a laser light source is prepared which can secure the safety standard of the class 1 in the wide state which is advantageous in achieving higher brightness. In a case where the zoom lens is set in a state other than the wide state, the output of the laser light source is suppressed to a level to satisfy the safety standard of the class 1 according to the energy density determined by the size of the laser beam area on the light emitting surface of the projection lens at that time. Alternatively, a light reducing means for reducing the amount of light that reaches the light emitting surface of the projection lens to the level is provided in the projector. In this way, if the amount of energy of the laser beam is controlled, the problem in safety can be solved, which makes it possible to produce a legal projector on a commercial basis.

According to the present invention, the output value of the laser light source that is needed in order to satisfy the safety class is determined in the wide state of the zoom lens. In a state other than the wide state, if any measures are not taken, the laser light source will be suppressed because the safety standard cannot be satisfied. Alternatively, the light power density on the light emitting surface of the projection lens is reduced to conform to the safety standards by the light reducing means provided in a portion other than the light source in the projector.

In the case of this invention, the light output (W) of the projector acquired in the wide state of the zoom lens is maximum, and the light output (W) becomes minimum in the telescopic state. In other words, the same light output (or the same amount of emitted light (lumen)) cannot be acquired from the projector over the full range in which the magnification of the zoom lens is changed. However, this does not present an obstacle in the sense of realizing a projector of high brightness. This is because the projector according to the present invention can achieve higher brightness in the wide state of the zoom lens than a projector that is designed to satisfy the safety standards in the telescopic state of the zoom lens without taking any counter measures. In addition, this is because the projector according to the present invention satisfies legal safety requirements over the full range in which the magnification of the zoom lens is changed.

Embodiment of the Invention

Hereinafter, an embodiment of a projector according to the present invention will be described with reference to the drawings.

Figure 2:
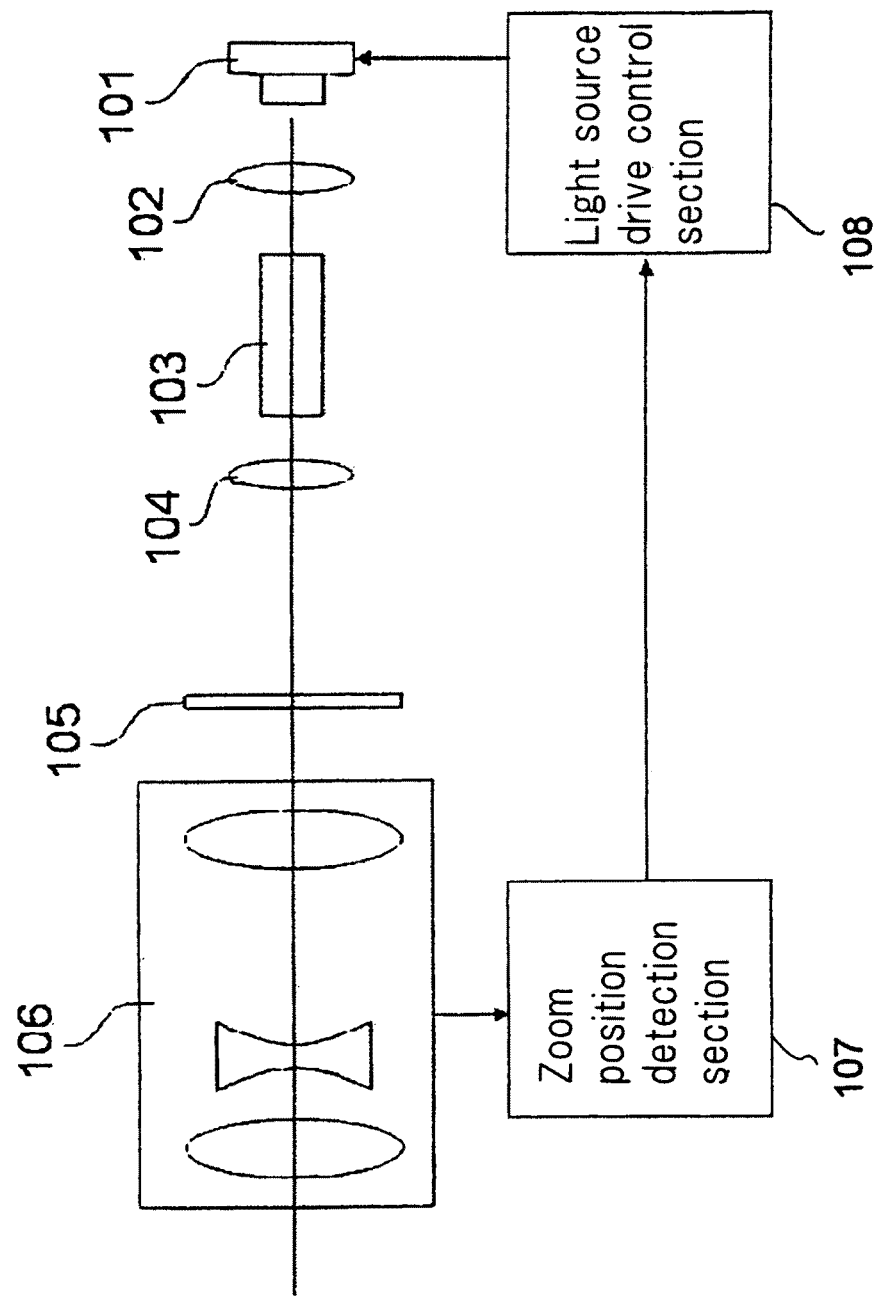
FIG. 2 is a view to illustrate the construction of a first embodiment of the present invention.

FIG. 2 is a view to illustrate the construction of a first embodiment according to the present invention. The projector of the present embodiment includes laser light source 101, image modulation device 105, zoom lens 106, zoom position detection section 107, and light source drive control section 108. Further, a lens system for magnifying a laser beam emitted from laser light source 101 to a size corresponding to image modulation device 105 is arranged between laser light source 101 and image modulation device 105. The lens system is constructed of lens 102, integrator 103, and lens 104 in this order along the direction in which the laser beam travels.

A semiconductor laser or a solid laser can be used as laser light source 101. As to a laser light source to emit color light such as red and blue, a semiconductor laser that is already produced in large volume for a DVD and a blue ray can be acquired at a comparatively low price. Further, as to a laser for emitting green color, a laser light source acquired by wavelength conversion developed by an SHG (second harmonic generation) element can be utilized. However, the present invention is not limited to these laser light sources.

Lens systems 102, 104 and integrator 103 are optical elements. Image modulation device 105 is a micro display for forming a two-dimensional image and, for example, a transmissive liquid crystal light valve, a DMD (digital mirror device), or an LCOS (Liquid Crystal On Silicon, a reflective liquid crystal element) can be used as image modulation device 105.

Zoom lens 106 is a lens for producing an image formed by two-dimensional image modulation device 105 on a screen or a white wall (which are not shown in the drawing).

Zoom position detection section 107 is a section for detecting a change in the focal distance of zoom lens 106, that is, a zoom position responsive to a change in a zoom magnification. The zoom position described here means the position of a part of a group of inner lenses, which construct the zoom lens 106, when the part of the group of the inner lenses is moved along an optical axis to determine the focal distance of zoom lens 106 (the projection distance to the screen or the zoom magnification).

As an example of a device for detecting the zoom position, a zoom ring that is provided on the lens tube of the zoom lens and that is rotated around the central axis of the lens tube to change the zoom position can be presented. The zoom ring of a position changing means like this is fixed with a position sensor as the zoom position detection section 107 for detecting the rotational angle of the zoom ring.

When a corresponding relationship between the rotational angle of the zoom ring, the position of the part of the group of the inner lenses of zoom lens 106, and the focal distance of zoom lens 106 (the projection distance to the screen or the zoom magnification) determined by the position is found in advance, the present zoom position corresponding to the projection distance to the screen or to the zoom magnification can be found from the rotational angle of the zoom ring detected by the position sensor.

In the zoom ring in this case, a rotation range is limited. When the zoom ring is rotated to one end of the rotation range, zoom lens 106 is brought into a state in which the focal distance is shortest, that is, into a wide state, whereas when the zoom ring is rotated to the other end, zoom lens 106 is brought into a state in which the focal distance is longest, that is, into a telescopic state. Of course, other zoom position changing means that are different from the zoom lens described above may be applied to the projector of the present invention.

Light source drive control section 108 assumes the role of supplying electric power for driving laser light source 101 and controls the amount of electricity supplied to laser light source 101 on the basis of the detection result of zoom position detection section 107.

In this regard, the construction view in FIG. 2 is shown as a schematic view, so that only one light source and one image modulation device are illustrated. However, when the projector is constructed of a light source of three colors, three lasers are required and three spatial light modulators can be also used. Of course, it is needless to say that in a case where a reflective image modulation device such as the LCOS and the DMD is used, the layout of the optical system is that of a reflective optical system. Further, also as to the integrator, a fry-eye lens or the like can be used as the integrator. In short, any construction can be used as the construction of the optical system as long as the construction can control an AEL value changed by the difference in the size of the laser beam area on the light emitting surface of the projection lens so as not to exceed a set value in any state.

Next, the operation of the present projector will be described.

A user changes the magnification of zoom lens 106 by operating the zoom ring. That is, when the user magnifies or reduces an image projected on the screen, the information of the zoom position at that time is detected by zoom position detection section 107 by the operation.

At this time, the size of the laser beam area on light emitting surface 106a of zoom lens 106 can be found on the basis of the zoom position. The size (area) of the laser beam area can be previously found in detail by tracking a light path because the specification of zoom lens 106 is known. For example, the size (area) of the laser beam area can be calculated on the basis of the simulation of an illumination system including zoom lens 106. For this reason, the sizes (areas) of the laser beam area on light emitting surface 106a, which correspond to all zoom positions, are previously calculated and are stored in light source drive control section 108 and the like. Further, the AEL value (W/mm$^2$) that satisfies the safety class of the projector is known, so that the allowable laser output value (W) can be easily calculated by finding the size (mm$^2$) of the laser beam area corresponding to the zoom position.

In the present invention, the output value of the laser light source 101 is set in such a way that the laser power density in the laser beam area on light emitting surface 106a becomes the AEL value when zoom lens 106 is adjusted to the wide state in which the laser beam area on light emitting surface 106a becomes maximum. In the case of the present embodiment, the electric power supplied to laser light source 101 is controlled by light source drive control section 108 so as to realize such output value of laser light source 101.

As zoom lens 106 is adjusted from the wide state to the telescopic state, the size of the laser beam area on light emitting surface 106a becomes smaller. Hence, if the output value set to laser light source 101 is held unchanged, the laser power density in the laser beam area on light emitting surface 106a will be larger than the AEL value.

For this reason, light source drive control section 108 drives laser light source 101 in such a way that the output of laser light source 101 is reduced by a decrease in the size of the laser beam area according to zoom adjustment from the wide state to the telescopic state. In this way, even if the zoom position is changed, the laser power density in the laser beam area on light emitting surface 106a can be held at a value equal to or smaller than the AEL value.

On the other hand, when zoom lens 106 is set to the telescopic state as an initial state and the zoom adjustment is made from the initial state to the wide state, the present zoom position is detected by zoom position detection section 107 and the size of the laser beam area on light emitting surface 106a of the zoom lens can be also found from the information of the detected present zoom position. Then, from the found size of the laser beam area, the information of electric power corresponding to the laser output that is allowed to increase to the AEL value is calculated by light source drive control section 108. Light source drive control section 108 increases the electric power to be supplied to laser light source 101 on the basis of this information of the electric power.

When making a supplement, in the present projector, the laser power density in the laser beam area on light emitting surface 106a when zoom lens 106 is set to the wide state is made equal to the AEL value that is the safety standard of the projector. Further, when the present zoom position is detected by zoom position detection section 107, the size of the laser beam area corresponding to the detected zoom position can be found. An output value to be set to laser light source 101 is calculated by the use of the size of the laser beam area, which corresponds to the zoom position, and the AEL value, and laser light source 101 is supplied with electric power in such a way that the output of laser light source 101 becomes the calculated output value.

In this way, the present invention can provide a projector that detects the present zoom position to thereby always make the laser power density in the laser beam area on the light emitting surface 106a not larger than the set safety standard (AEL value in the wide state) over the full range in which the magnification of the zoom lens is changed, in other words, a projector that can provide a bright projection image and is safe.

Modification of the First Embodiment

Figure 3:
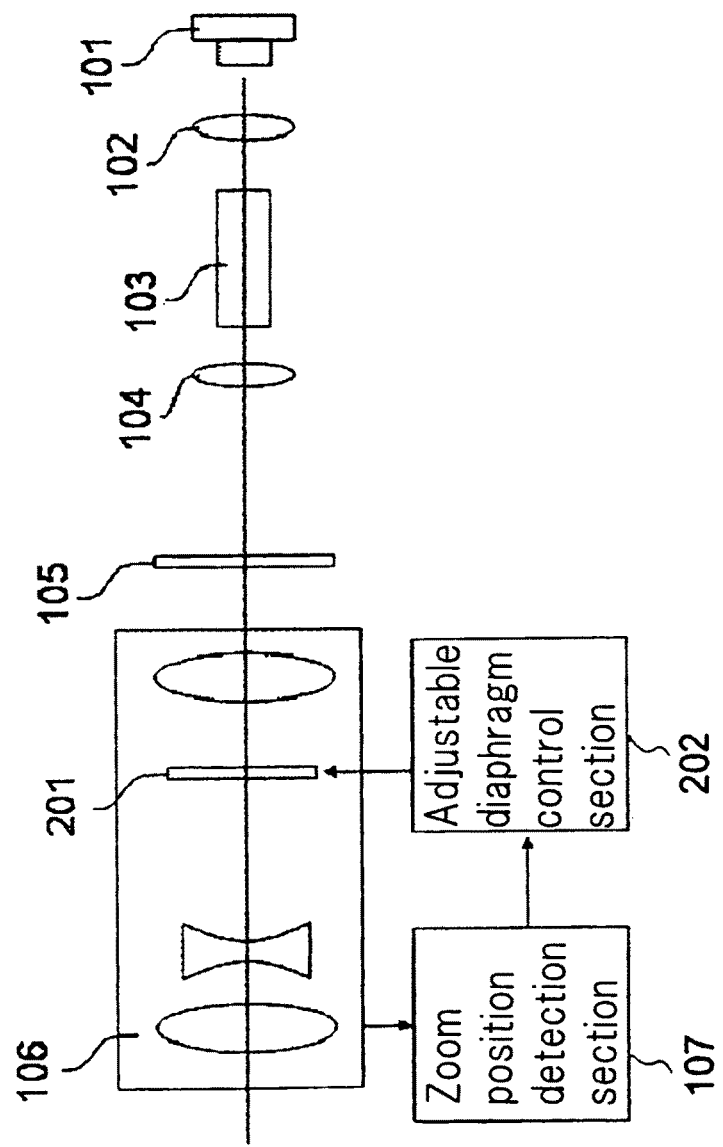
FIG. 3 is a view to illustrate a modification of the first embodiment of the present invention.

The construction of a modification of the first embodiment will be shown in FIG. 3. Here, the same constituent elements as those in the first embodiment are denoted by the same reference characters, and the descriptions of the constituent elements will be the same as those described above.

As a method for keeping the energy density (power density) of the laser beam developed on the light emitting surface of the zoom lens at the specified AEL value or smaller, in the first embodiment described above, the electric power to be supplied to the laser light source 101 is controlled by light source drive control section 108. In contrast to this, in the modification to be described below will be described a method for reducing the amount of light of the laser beam that reaches light emitting surface of the zoom lens 106 by adjustable diaphragm 201 that is provided in zoom lens 106 and the aperture of which can be electrically or mechanically changed.

As shown in FIG. 3, there is provided adjustable diaphragm control section 202 for driving and controlling adjustable diaphragm 201 provided in zoom lens 106. Adjustable diaphragm control section 202 controls the amount of light passing through adjustable diaphragm 201 on the basis of the detection result of zoom position detection section 107.

The operation of the present modification will be described.

When the user makes a zoom adjustment to zoom lens 106, the information of the zoom position at that time is detected by zoom position detection section 107. The size (area) of the laser beam area on the light emitting surface 106a of the zoom lens 106 can be acquired on the basis of the detection result. For this reason, the sizes (areas) of the laser beam area on light emitting surface 106a, which correspond to all zoom positions, can be calculated in advance and are stored in adjustable diaphragm control section 202 or the like.

The output value of laser light source 101 is set in such a way that the laser power density in the laser beam area on light emitting surface 106a becomes the AEL value in the wide state in which the size of the laser beam on light emitting surface 106a becomes maximum. In the present modification, laser light source 101 is driven by constant electric power so as to prevent the output value of laser light source 101 from changing at least during a zoom operation. Further, adjustable diaphragm 201 is controlled in such a way that in the wide state, the energy of the laser beam outputted from laser light source 101 reaches light emitting surface 106a of zoom lens 106 without being decreased.

While the zoom adjustment is made, the laser power density (W/mm$^2$) in the laser beam area is calculated by the use of the size (mm$^2$) of the laser beam area on light emitting surface 106a, which corresponds to the detected zoom position, and the set output value (W) of laser light source 101.

As the zoom adjustment is made from the wide state to the telescopic state, the size of the laser beam area on the light emitting surface 106a becomes smaller. At this time, because the laser output of laser light source 101 is constant, if counter measures are not taken, the laser power density in the laser beam area on light emitting surface 106a will become larger than the AEL value.

For this reason, in this modification, the amount of light (the amount of energy) of the laser beam, which is emitted from laser light source 101 and that reaches the light emitting surface 106a of zoom lens 106, is limited in such a way that the calculated laser power density (W/mm$^2$) becomes equal to or smaller than the AEL value. In other words, the size of the aperture of adjustable diaphragm 201 (the amount of light passing through the aperture) is controlled by adjustable diaphragm control section 202 in such a way that the calculated laser power density (W/mm$^2$) is the AEL value or less for all zoom positions.

On the other hand, when zoom lens 106 is set to the telescopic state as an initial state and the zoom adjustment is made from this state to the wide state, the present zoom position is detected by zoom position detection section 107 and the size of the laser beam area on light emitting surface 106a of the projection lens can be also found from the information of the detected present zoom position. The amount of light passing through adjustable diaphragm 201, which corresponds to the laser output that is allowed to increase to the AEL value, is calculated by adjustable diaphragm control section 202 from the found size of the laser beam area. Adjustable diaphragm control section 202 increases the size of the aperture (the amount of light passing through the aperture) of adjustable diaphragm 201 on the basis of the calculated amount of light.

Also in the method of this modification, the laser power density in the laser beam area developed on the light emitting surface of the zoom lens can be kept at a specified AEL value or less, in other words, a safe projector can be provided. Further, by determining the standard of the AEL value in the state where the zoom lens 106 is set to the wide state, the brightness of the projection image in the wide state can be increased to the maximum extent.

Up to this point, the invention as claimed in this application has been described by describing the embodiments, but the invention as claimed in this application is not limited to the embodiments described above. It is evident that various alternatives and modifications that those skilled in the art can understand may be made to the form and the details of the invention as claimed in this application within the scope of the technical spirit of the invention as claimed in this application.

The invention claimed is:

1. A projector that applies a laser beam emitted from a laser light source to an image modulation device and that magnifies and projects an image formed in the image modulation device by a zoom lens, the projector comprising:
    a control device for controlling an amount of energy of the light beam in a response to a change in a focal distance of the zoom lens in such a way that an energy density of the laser beam developed on a light emitting surface of the zoom lens is kept at a specified value or smaller than the specified value,
        wherein the control device changes an output of the laser light source in the response to the change in the focal distance of the zoom lens so as to control the amount of energy of the light beam; and
    a zoom position detection section that detects a zoom position of the zoom lens, a size of the laser beam area on the light emitting surface of the zoom lens being calculated from information of the detected zoom position.

2. A projector as claimed in claim 1, wherein, in order to control the amount of energy of the light beam, the control device uses an adjustable diaphragm comprising an aperture, through which the laser beam emitted from the laser light source passes and which changes an amount of light, and the control device changes a size of the aperture of the adjustable diaphragm in the response to the change in the focal distance of the zoom lens.

3. A projector as claimed in any one of claim 1, wherein the specified value comprises an energy density of the laser beam developed on the light emitting surface of the zoom lens in a case where the focal distance of the zoom lens is set to a shortest value.

4. A projector as claimed in any one of claim 3, wherein the energy density of the laser beam developed on the light emitting surface of the zoom lens in a case where the focal distance of the zoom lens is set to the shortest value comprises an accessible emission limit value (AEL value) that satisfies a laser safety class of the projector.

5. A projector as claimed in claim 1, further comprising:
    a change mechanism for changing the focal distance of the zoom lens.

6. A projector as claimed in claim 5, wherein the change mechanism comprises a zoom ring that is rotatably fixed to a lens tube of the zoom lens and that is rotated to move a part of a group of inner lenses along a light axis to thereby determine the focal distance of the zoom lens, and
    wherein the projector further includes a detection device for detecting a position of the part of the group of the inner lenses which determines the focal distance in a response to a rotational angle of the zoom ring.

7. A method for controlling a projector that applies a laser beam emitted from a laser light source to an image modulation device and that magnifies and projects an image formed in the image modulation device by a zoom lens, the method comprising:
    controlling an amount of energy of the light beam in a response to a change in a focal distance of the zoom lens in such a way that an energy density of the laser beam developed on a light emitting surface of the zoom lens is kept at a specified value or smaller than the specified value,
        wherein said controlling the amount of energy of the light beam comprises changing an output of the laser light source in the response to the change in the focal distance of the zoom lens to control the amount of energy of the light beam; and
    detecting a zoom position of the zoom lens, a size of a laser beam area on the light emitting surface of the zoom lens being calculated from information of the detected zoom position.

8. A method for controlling a projector as claimed in claim 7, wherein the specified value comprises an energy density of the laser beam developed on the light emitting surface of the zoom lens in a case where the focal distance of the zoom lens is set to a shortest value.

9. A method for controlling a projector as claimed in claim 8, wherein the energy density of the laser beam developed on the light emitting surface of the zoom lens in the case where the focal distance of the zoom lens is set to the shortest value comprises an accessible emission limit value (AEL value) that satisfies a laser safety class of the projector.

10. A method for controlling a projector as claimed in claim 7, wherein the projector comprises an adjustable diaphragm through which the laser beam emitted from the laser light source passes, a size of an aperture of the adjustable diaphragm being changed in the response to the change in the focal distance of the zoom lens.

11. A method for controlling a projector as claimed in claim 7, wherein an output of laser light source is reduced by a decrease in the size of the laser beam area based on a zoom adjustment from a wide state to a telescopic state.

12. A method for controlling a projector as claimed in claim 7, wherein, in said controlling the amount of energy of the light beam, based on the calculated size of the laser beam area, information of an electric power corresponding to the output of the laser light source is calculated, and wherein the electric power that is supplied to the laser light source is changed based on the information of the electric power.

13. A projector as claimed in claim 1, wherein based on the calculated size of the laser beam area, the control device calculates information of an electric power corresponding to the output of the laser light source.

14. A projector as claimed in claim 13, wherein the control device changes the electric power that is supplied to the laser light source on a basis of the information of the electric power.

* * * * *